(12) United States Patent
Kang

(10) Patent No.: US 8,215,027 B2
(45) Date of Patent: Jul. 10, 2012

(54) TAPE MEASURE WITH SELF-REGULATING SPEED CONTROL MECHANISM

(75) Inventor: Dong Hun Kang, Busan (KR)

(73) Assignee: Komelon Corporation (KR)

( * ) Notice: Subject to any disclaimer, the term of this patent is extended or adjusted under 35 U.S.C. 154(b) by 0 days.

(21) Appl. No.: 13/092,425

(22) Filed: Apr. 22, 2011

(65) Prior Publication Data

US 2011/0258870 A1 Oct. 27, 2011

(30) Foreign Application Priority Data

Apr. 23, 2010 (KR) .................. 10-2010-0037804

(51) Int. Cl.
*G01B 3/10* (2006.01)
(52) U.S. Cl. .......................................... 33/761; 33/767
(58) Field of Classification Search .................... 33/755, 33/761, 767, 768; 242/389, 390, 391, 392
See application file for complete search history.

(56) References Cited

U.S. PATENT DOCUMENTS

| | | | |
|---|---|---|---|
| 3,889,897 A | | 6/1975 | Van Zelderen |
| 5,448,837 A | * | 9/1995 | Han-Teng ........................ 33/761 |
| 5,829,154 A | | 11/1998 | Lin |
| 5,875,987 A | * | 3/1999 | Pullen ............................. 33/755 |
| RE37,824 E | * | 9/2002 | Pullen ............................. 33/755 |
| 6,477,785 B1 | * | 11/2002 | Hsu ................................. 33/761 |
| 2004/0118002 A1 | * | 6/2004 | Lu .................................. 33/767 |
| 2004/0211856 A1 | * | 10/2004 | Blackman et al. ............... 33/761 |
| 2008/0263886 A1 | | 10/2008 | Kang |
| 2010/0212175 A1 | * | 8/2010 | Choi ............................... 33/761 |

FOREIGN PATENT DOCUMENTS

KR 10-2009-0036433 4/2009

\* cited by examiner

*Primary Examiner* — G. Bradley Bennett

(74) *Attorney, Agent, or Firm* — Wenderoth, Lind & Ponack, L.L.P.

(57) ABSTRACT

Disclosed herein is a tape measure with a self-regulating speed control mechanism. In the present invention, when a bobbin rotates, a rubber roller rotatably provided on a movable mounting plate alternately comes into contact with an inner surface of a support ring and a rubber acceleration prevention member provided on the inner surface of the support ring, so that the speed of the bobbin can be smoothly and reliably reduced.

5 Claims, 9 Drawing Sheets

[FIG. 1]
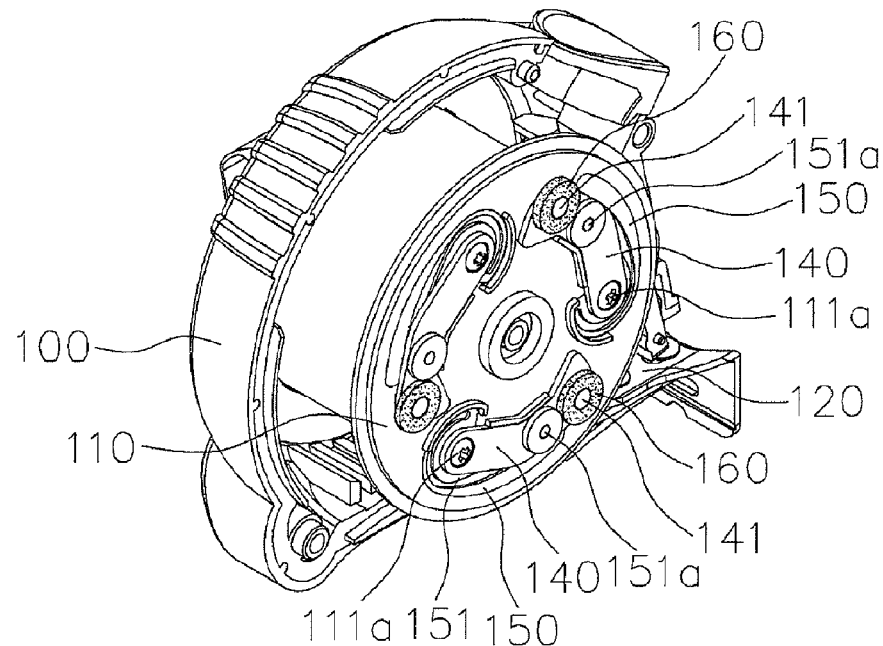
[Fig. 2]
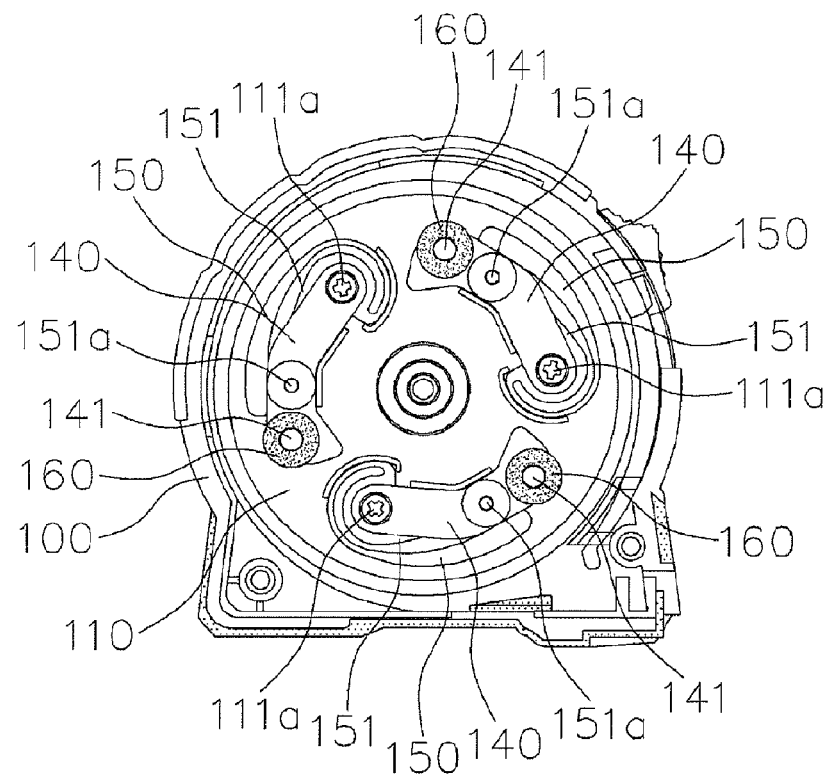

[Fig. 3]
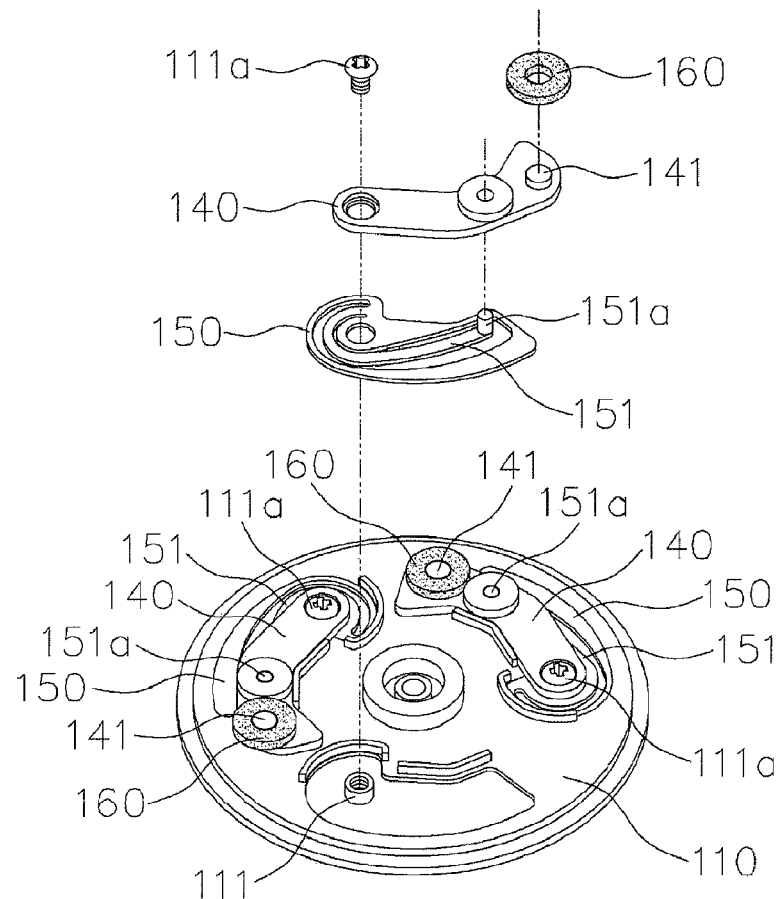
[Fig. 4]
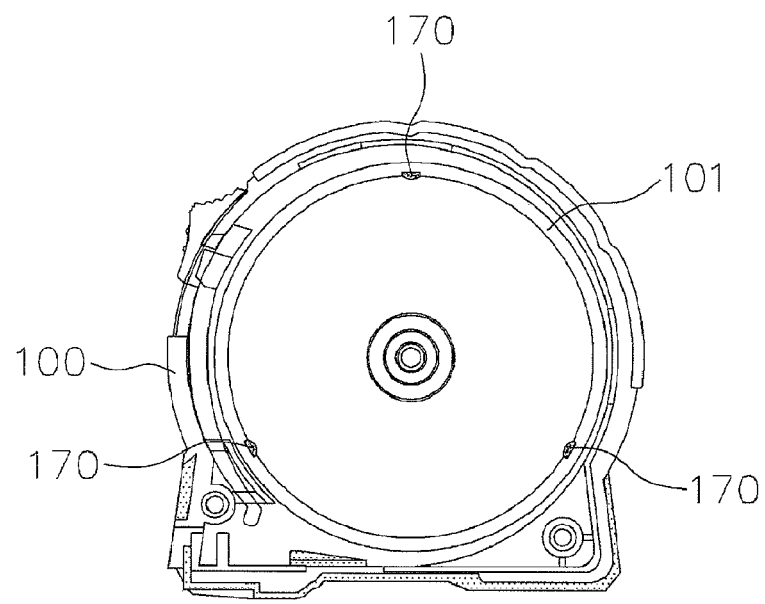

[Fig. 5A]
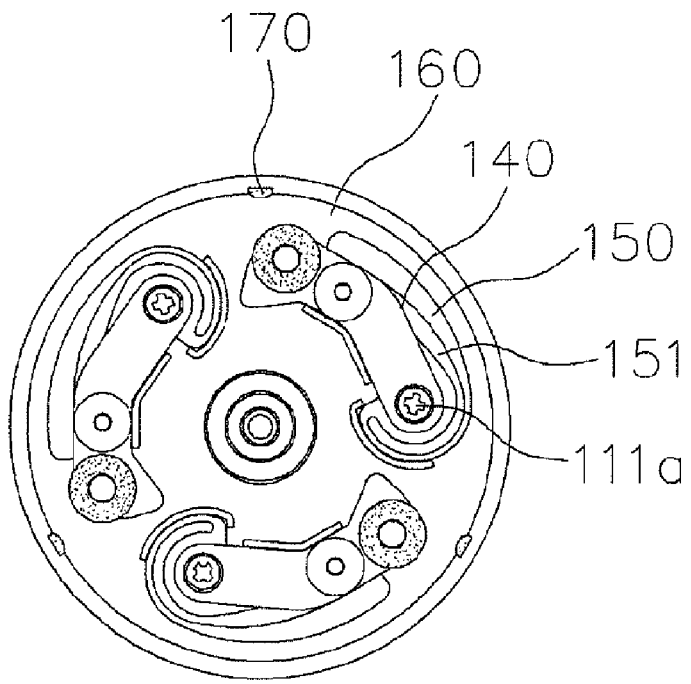
[Fig. 5B]
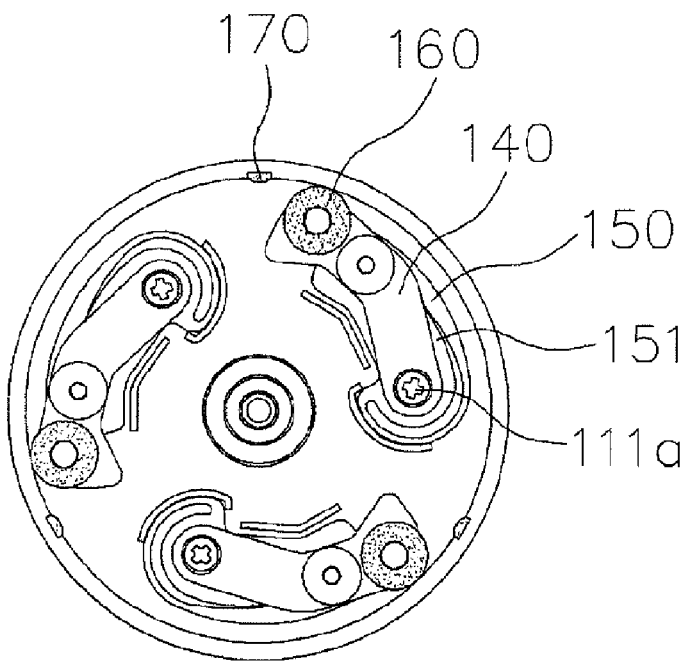

[Fig. 5C]
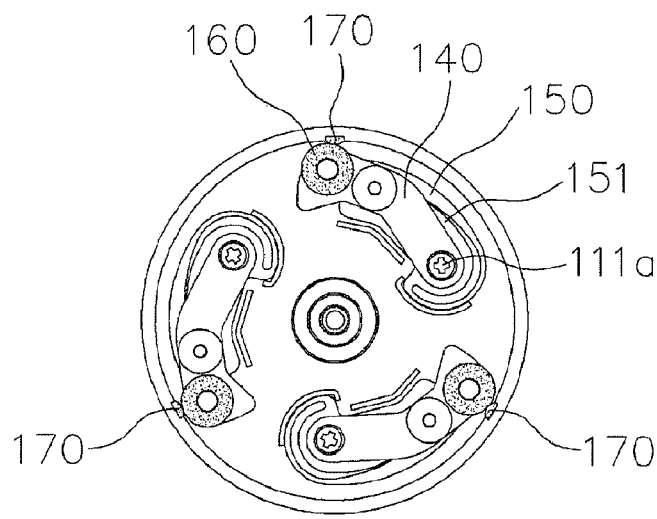
[Fig. 6]
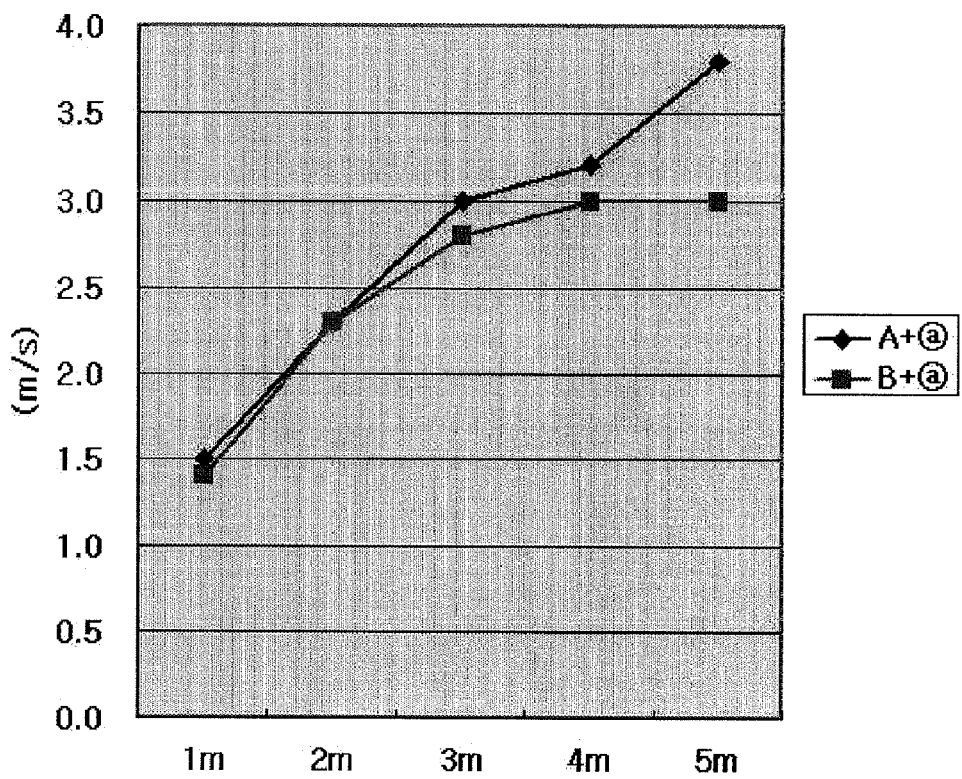

[Fig. 7]
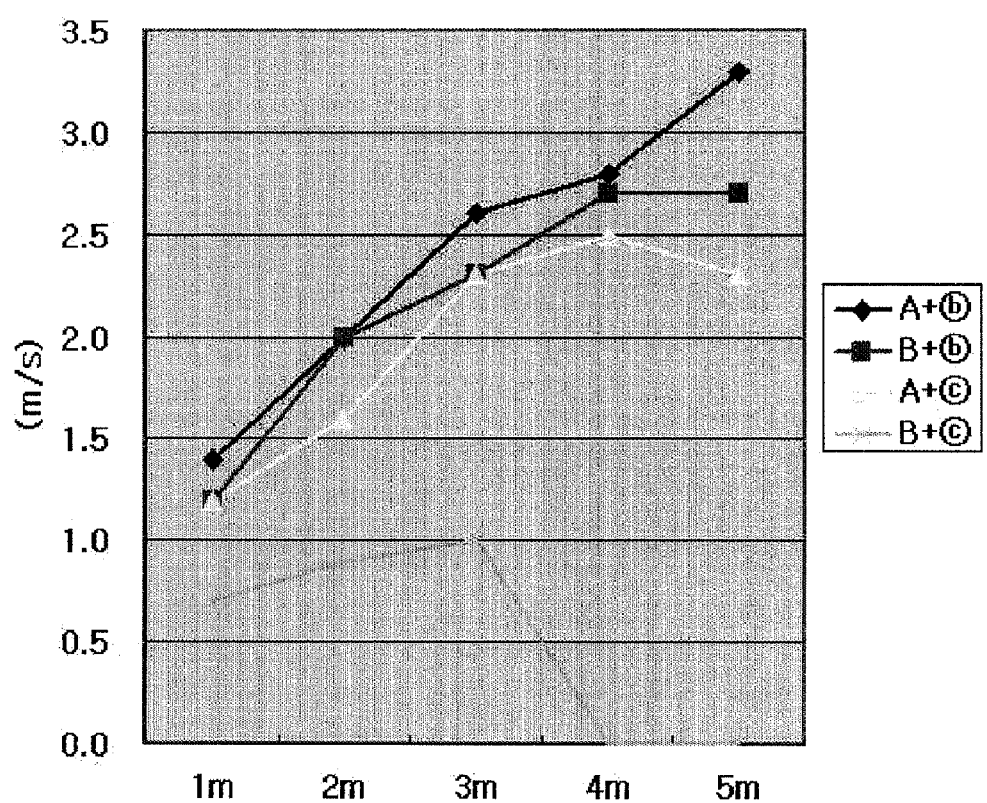

[Fig. 8]
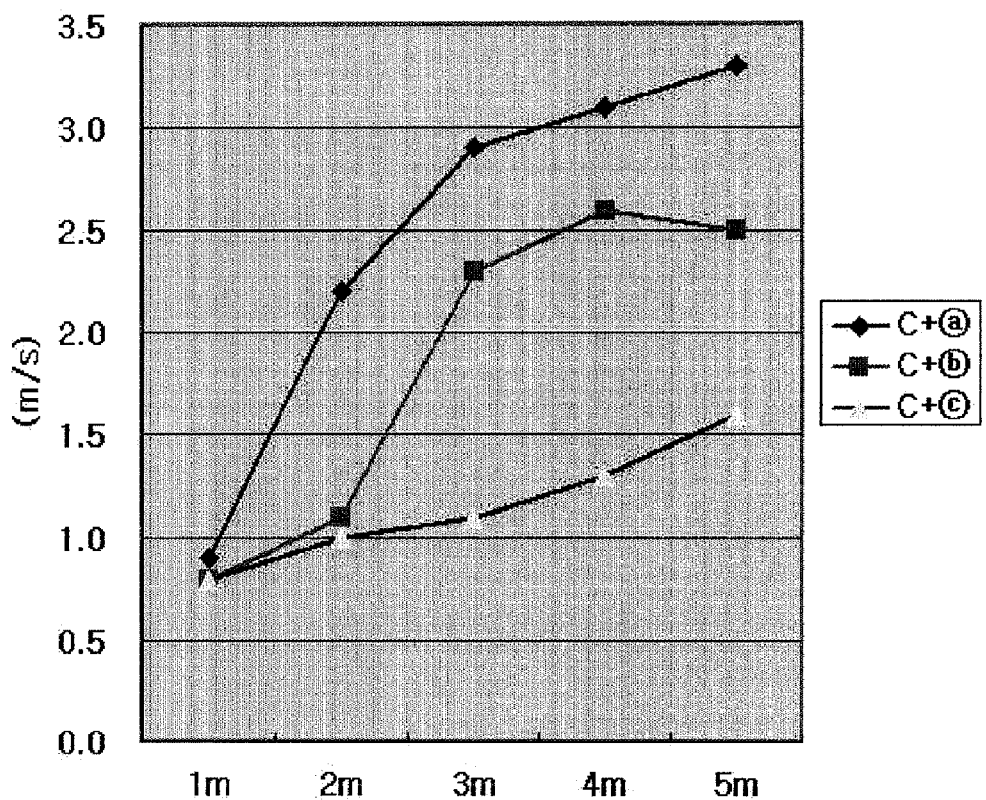
[Fig. 9A]
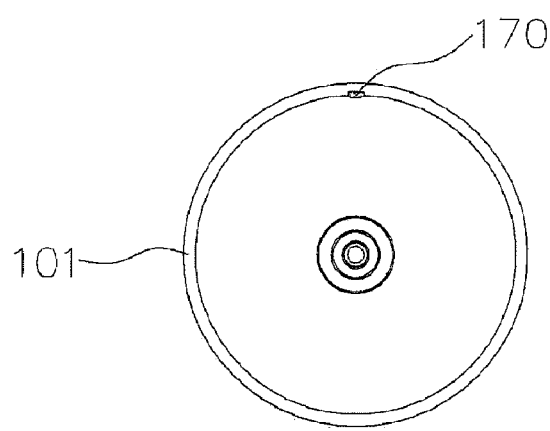

[Fig. 9B]
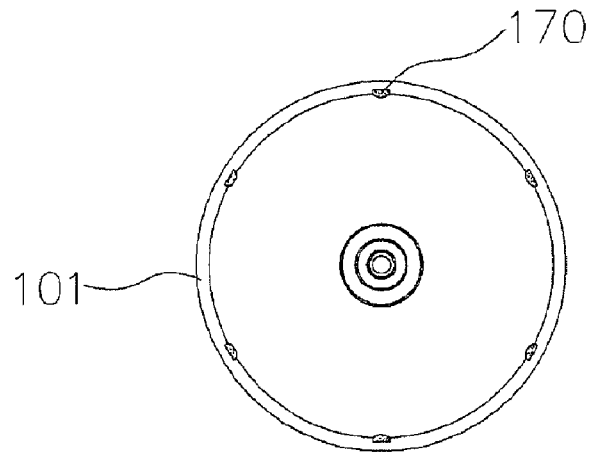
[Fig. 9C]
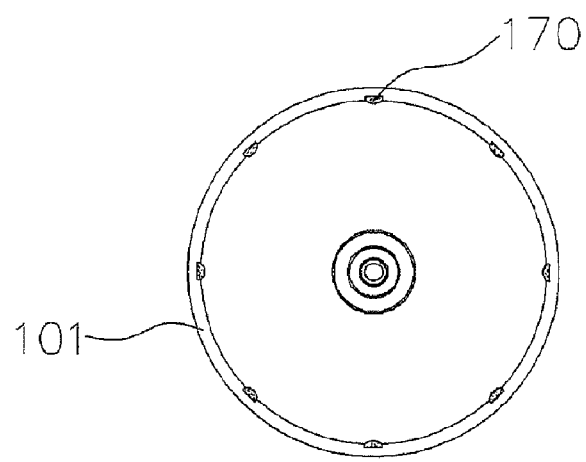
[Fig. 9D]
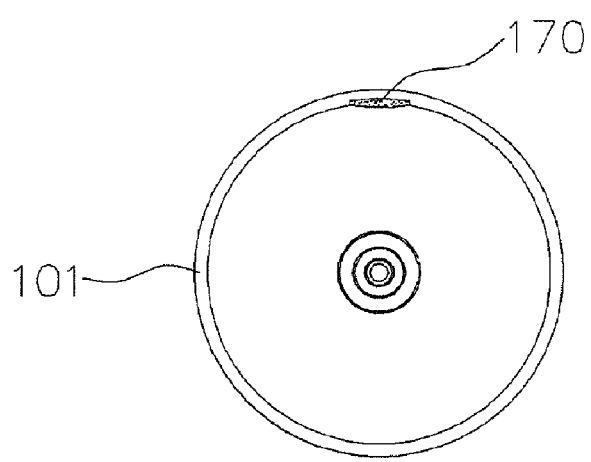

[Fig. 9E]
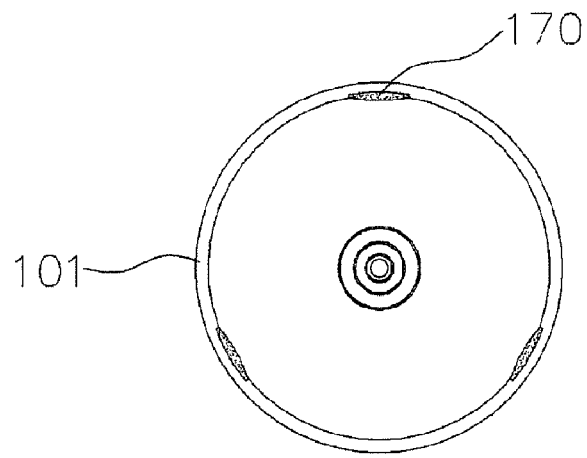
[Fig. 9F]
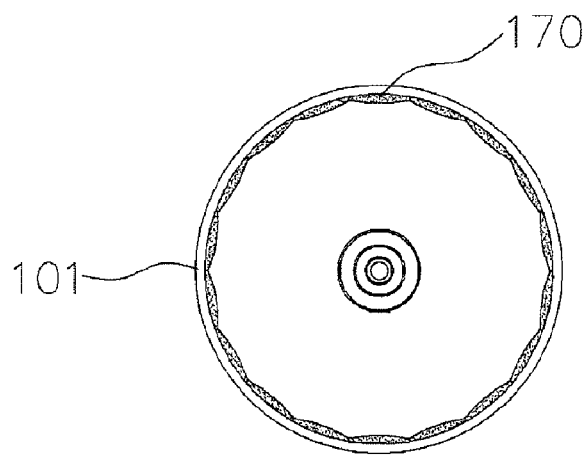
[Fig. 9G]
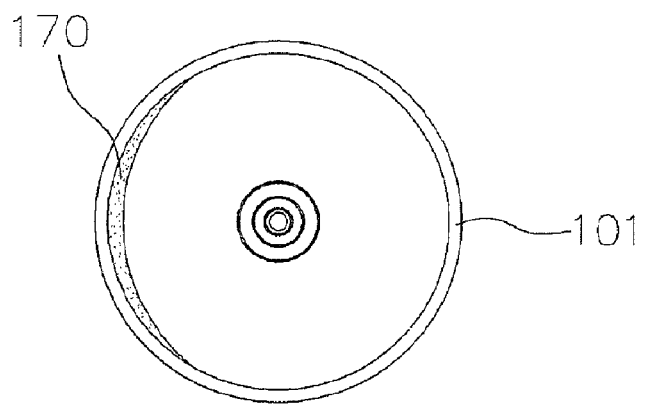

[Fig. 9H]
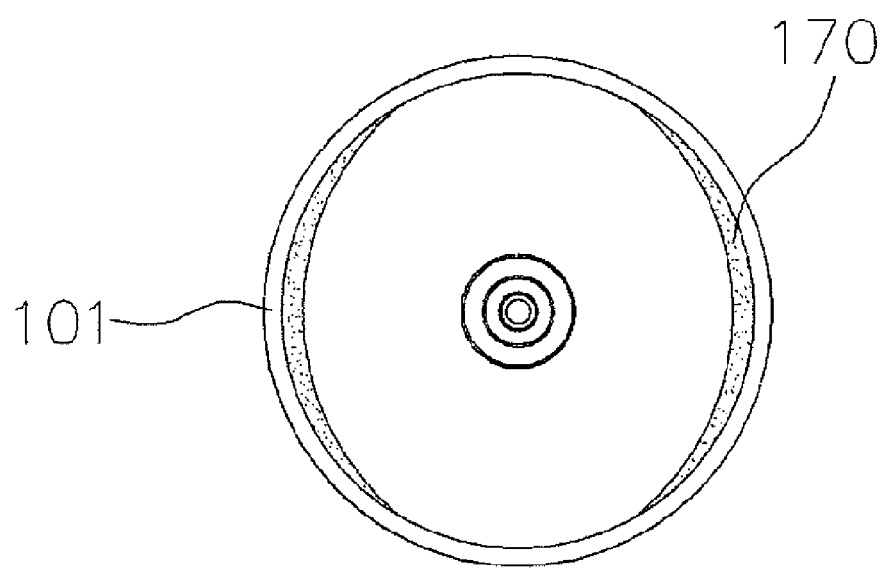

TAPE MEASURE WITH SELF-REGULATING SPEED CONTROL MECHANISM

BACKGROUND OF THE INVENTION

1. Field of the Invention

The present invention relates generally to tape measures and, more particularly, to a tape measure with a self-regulating speed control mechanism by which when a blade that has been extracted from a casing is retracted into the casing, the retraction speed of the blade is self-controlled such that a predetermined speed is maintained.

2. Description of the Related Art

Generally, a tape measure includes a casing in which a bobbin is rotatably provided. One end of a blade (referred to simply as a "tape") is wound around the bobbin, and the other end thereof protrudes out of the casing. The end of the blade that protrudes out of the casing is pulled and extracted and then used to make a variety of measurements.

To rewind the blade around the bobbin again after the measurements have been completed, a first elastic member is coupled to the bobbin and provides elastic rotating force to the bobbin. A plate spring which is wound up in a coil shape is typically used as the first elastic member.

When the blade is returned to its original position by the elastic force of the first elastic member, the speed at which the blade is retracted into the casing is gradually increased by the elastic force of the first elastic member. Therefore, if the portion of the blade that is extracted from the casing is very long, the acceleration of the blade which is being retracted into the casing is excessively increased. Thus, a user who is using the tape measure or nearby people may be injured or the tape measure itself may be damaged.

In an effort to overcome the above-mentioned problem, techniques incorporated herein were proposed in U.S. Pat. No. 3,889,897 (registered on Jun. 17, 1975), entitled "COILABLE TAPE MEASURING DEVICE HAVING A SELF-REGULATING SPEED CONTROL MECHANISM", and in U.S. Patent No. 2008-0263886, entitled "TAPE MEASURE WITH A SELF-REGULATED SPEED CONTROL MECHANISM".

SUMMARY OF THE INVENTION

Accordingly, the present invention has been made keeping in mind the above problems occurring in the prior art, and an object of the present invention is to provide a tape measure with a self-regulating speed control mechanism by which the speed at which a blade is retracted into a casing can be self-controlled and maintained at an appropriate speed such that it is prevented from being excessively fast or slow, and which can prevent noise from occurring when the blade is retracted.

In order to accomplish the above object, the present invention provides a tape measure in which when a bobbin rotates, a rubber roller rotatably provided on a movable mounting plate alternately comes into contact with an inner surface of a support ring and a rubber acceleration prevention member provided on the inner surface of the support ring, so that the speed of the bobbin can be smoothly and reliably reduced.

In an exemplary embodiment, the acceleration prevention member may protrude from the inner surface of the support ring.

In an exemplary embodiment, the acceleration prevention member may comprise a plurality of acceleration prevention members provided on the inner surface of the support ring at positions spaced apart from each other.

In an exemplary embodiment, the second elastic member may comprise a plastic plate mounted to the bobbin, with a cantilever provided on the plastic plate, and the movable mounting plate may have a first end supported on the sidewall of the bobbin by a pivot, and a second end coupled to a free end of the cantilever, so that the movable mounting plate is rotated around the pivot and elastically supported by the cantilever of the plastic plate.

BRIEF DESCRIPTION OF THE DRAWINGS

The above and other objects, features and advantages of the present invention will be more clearly understood from the following detailed description taken in conjunction with the accompanying drawings, in which:

FIG. 1 is a perspective view showing a bobbin-side casing of a tape measure, according to an embodiment of the present invention;

FIG. 2 is a front view of FIG. 1;

FIG. 3 is an exploded perspective view of a critical portion of a bobbin of FIG. 1

FIG. 4 is a front view showing a bobbin-opposite-side casing of the tape measure of FIG. 1;

FIGS. 5A through 5C are views showing the operation of the tape measure of FIG. 1;

FIGS. 6 through 8 are graphs showing the speed of a blade at the final moment of a retraction process in several experimental examples;

FIGS. 9A through 9H are views showing various examples of the disposition of acceleration prevention members according to the present invention.

DESCRIPTION OF THE PREFERRED EMBODIMENTS

Hereinafter, a preferred embodiment of the present invention will be described in detail with reference to the attached drawings.

FIG. 1 is a perspective view showing a bobbin-side casing of a tape measure, according to an embodiment of the present invention. FIG. 2 is a front view of FIG. 1. FIG. 3 is an exploded perspective view of a critical portion of a bobbin 110 of FIG. 1. FIG. 4 is a front view showing a bobbin-opposite-side casing of the tape measure of FIG. 1. FIGS. 5A through 5C are views showing the operation of the tape measure of FIG. 1.

The bobbin 110 is rotatably provided in a casing 100.

The casing 100 of this embodiment includes the bobbin-side casing and the bobbin-opposite-side casing which are assembled with each other. As shown in FIG. 1, the bobbin 110 is mounted to the bobbin-side casing. As shown in FIG. 4, the bobbin-opposite-side casing is not provided with the bobbin 110. A first end of the blade 120 is fastened to the bobbin 110, and the blade 120 is wound around the bobbin 110. In a manner similar to a typical tape measure, graduations to measure lengths are marked on the blade 120 and arranged in the longitudinal direction thereof.

A second end of the blade 30 protrudes out of the casing 100. Generally, marking the graduations on the tape measure uses the second end of the blade 30 as a reference point.

Furthermore, a first elastic member (not shown) is provided in the casing 100 and provides rotating force to the bobbin 110 to return the extracted blade 120 to its original position. Preferably, the first elastic member (not shown) comprises a plate spring which is wound up in a coil shape.

The casing 100, the bobbin 110, the blade 120 and the first elastic member (not shown) that have the above-mentioned construction adopt the typical construction of a well known tape measure, and the construction may be changed in a variety of manners.

At least one movable mounting plate 140 is provided on one sidewall of the bobbin 110. For example, in this embodiment, three movable mounting plates 140 are provided on the sidewall of the bobbin 110.

When the bobbin 110 rotates, the movable mounting plates 140 rotate along with the bobbin 110.

The movable mounting plates 140 are provided on the bobbin 110, rather than being fixed to the bobbin 110, so as to be movable on the sidewall of the bobbin 110 in such a way as to change the distance from a center of rotation of the bobbin 110. Here, the term "movable" implies rotation as well as linear movement.

In this embodiment, changing the distance of each movable mounting plate 140 from the center of rotation of the bobbin 110 is embodied by configuring the movable mounting plate 140 such that a first end thereof is rotatably supported by a pivot 111 provided on the bobbin 110.

Therefore, the movable mounting plates 140 can not only rotate along with the bobbin 110 but also rotate around the corresponding pivots 111 with respect to the bobbin 110. Thus, when the bobbin 110 rotates, the movable mounting plates 140 are rotated along with the bobbin 111 around the center of rotation of the bobbin 111 and are simultaneously rotated around the pivots 111 by the centrifugal force.

In the embodiment, three second elastic members 150 are provided on the sidewall of the bobbin 110 and elastically bias the respective movable mounting plates 140 towards the center of rotation of the bobbin 110.

Furthermore, each second elastic member 150 comprises a plastic plate 150 having a cantilever 151.

Each plastic plate 150 is fastened to the bobbin 110 by the corresponding pivot 111 and its peripheral structure which are provided on the bobbin 110.

The cantilever 151 having a free end is provided in the plastic plate 150. The free end of the cantilever 151 has a coupling rod 151a to which the corresponding movable mounting plate 140 is coupled.

Furthermore, the first end of each movable mounting plate 140 is rotatably supported by the corresponding pivot 111. A coupling hole (not designated) is formed in a second end of each movable mounting plate 140 so that the coupling rod 151a of the corresponding cantilever 151 is inserted into the coupling hole.

When the bobbin 110 rotates, the movable mounting plates 140 are rotated along with the bobbin 110 around the center of rotation of the bobbin 110, and each movable mounting plate 140 is biased to be rotated outwards around the pivot 111 by the centrifugal force. While the movable mounting plate 140 is biased to be rotated outwards by the centrifugal force, the cantilever 151 uses its elastic force to elastically support the movable mounting plate 140 towards the center of rotation of the bobbin 110.

Furthermore, in the embodiment, each plastic plate 150 and the related movable mounting plate 140 are coupled to the corresponding pivot 110. To prevent removal of the plastic plate 150 and the movable mounting plate 140, a fastening bolt 111a is tightened into each pivot 110. This structure is very simple, making it easy to assemble the movable mounting plate 140 and the second elastic member 150 with the bobbin 110.

The second end of each movable mounting plate 140 also has a roller support shaft 141 which rotatably supports a roller 160. That is, the roller 160 made of rubber is rotatably provided around the roller support shaft 141. As necessary, the shape of the roller support shaft 141 may be variously changed.

In the present invention, the roller 160 is made of rubber that has appropriate elasticity and generally high frictional force (compared to hard plastic, the hard plastic has little elasticity and comparatively low frictional force). Therefore, the roller 160 can create the appropriate amount of friction when it rotates on the roller support shaft 141.

The foregoing description has pertained to the bobbin 110 provided on the bobbin-side casing.

Meanwhile, as shown in FIG. 4, a support ring 101 is provided in the bobbin-opposite-side casing.

In this embodiment, the support ring 101 integrally protrudes from the casing 100 towards the sidewall of the bobbin 110 on which the movable mounting plates 140 are provided. Of course, the support ring 101 may be separately assembled with the casing 100.

Furthermore, the support ring 101 has a circular ring shape which has a center which is consistent with the center of rotation of the bobbin 110.

In addition, the movable mounting plates 140 are located inside the support ring 101.

A plurality of acceleration prevention members 170 made of rubber is provided on an inner surface of the support ring 101.

When the bobbin 110 rotates, the acceleration prevention members 170 come into contact with the rollers 160 to reduce the rotational speed of the bobbin 110.

It is desirable that each acceleration prevention member 170 be made of rubber that has appropriate elasticity and a comparatively high friction coefficient.

When the tape measure is not in use or the rotational speed of the bobbin 110 is comparatively low, the roller 141 provided on each movable mounting plate 140 cannot be brought into contact with the support ring 101 or the acceleration prevention member 170 by the elastic force of the second elastic member 150 (refer to FIG. 5A).

However, when the centrifugal force applied to each movable mounting plate 140 overcomes the elastic support force of the second elastic member 150 as the rotational speed of the bobbin 110 increases, the movable mounting plate 140 rotates in a clockwise direction around the pivot 111. Then, the rollers 160 mounted to the movable mounting plates 140 come into contact with the support ring 101 (refer to FIG. 5B) or the acceleration prevention members 170 (refer to FIG. 5C), thus preventing the rotational speed of the bobbin 110 from increasing further.

The following experiment was performed to verify the effect of the tape measure according to the embodiment having the above-mentioned construction.

(1) Objects of the Experiment

The following experiment on tape measures with blades having the maximum extraction length of 8 m was processed.

The objects of the experiment have the same structure in that they include the blade, the first elastic member, the movable mounting plate, the second elastic member and the support ring.

The objects are however classified into experimental examples A, B and C according to whether the rubber roller is rotatably provided on each movable mounting plate, or a hard plastic brake or a soft rubber brake is fastened to the movable mounting plate in place of the rubber roller.

Furthermore, the objects are classified into experimental examples ⓐ, ⓑ, and ⓒ according to whether the support ring has nothing or a separate element.

Experimental Example A

In this example, a stationary hard plastic brake is provided on each movable mounting plate. In other words, this case is configured in such a way that the hard plastic brake is fastened to the movable mounting plate without having a structure like the roller and is brought into the support ring or the like to reduce the rotational speed of the bobbin.

Experimental Example B

In this example, a stationary soft rubber brake is provided on each movable mounting plate. That is, this case is configured in such a way that the soft rubber brake is fastened to the movable mounting plate without having a structure like the roller and is brought into the support ring or the like to reduce the rotational speed of the bobbin.

Experimental Example C

In this example, a rubber roller is rotatably provided on each movable mounting plate. That is, in this case, the roller of the embodiment of the present invention (the roller having the same structure as that of FIG. 2) is mounted to the movable mounting plate.

Experimental Example ⓐ

This example is a case in which only support ring is provided on the casing. In this case, the support ring has no acceleration prevention member and is made of hard plastic.

Experimental Example ⓑ

This example is a case in which acceleration prevention members made of hard plastic are provided on the support ring. In this case, the acceleration prevention members have the same shape and arrangement as those of the acceleration prevention members of FIG. 4, but the material thereof is made of hard plastic unlike the case of FIG. 4 that is made of rubber.

Experimental Example ⓒ

This example is a case in which acceleration prevention members made of rubber are provided on the support ring. That is, this case is entirely consistent with that of FIG. 4 including the rubber acceleration prevention members provided on the support ring.

With reference to the above examples, the tape measures that are the objects of the experiment could be classified as follows:
Experimental example 1: A+ⓐ
Experimental example 2: B+ⓐ
Experimental example 3: A+ⓑ
Experimental example 4: B+ⓑ
Experimental example 5: A+ⓒ
Experimental example 6: B+ⓒ
Experimental example 7: C+ⓐ
Experimental example 8: C+ⓑ, and
Experimental example 9: C+ⓒ.
Method of the Experiment:

The blade of each tape measure is released after it has been extracted to a distance of 1 m from the casing. When the blade is retracted into the casing in the above condition, the speed of the end of the blade just before it comes into contact with the casing, in other words, the final retraction speed of the end of the blade, was measured.

In the same manner, the final retraction speed of the end of the blade was measured in the cases where it was released after having been extracted to distances of 2 m, 3 m, 4 m and 5 m.

Results of the Experiments:

The following Table 1 shows the results of measuring the final retraction speed of the blade in the experimental examples as the distance to which the end of the blade is extracted is changed.

A unit of the final retraction speed of the blade is m/s.

TABLE 1

| Experimental example | | Extracted length | | | | |
|---|---|---|---|---|---|---|
| | | 1 m | 2 m | 3 m | 4 m | 5 m |
| Experimental example 1: A+ | ⓐ | 1.5 | 2.3 | 3.0 | 3.2 | 3.8 |
| Experimental example 2: B+ | ⓐ | 1.4 | 2.3 | 2.8 | 3.0 | 3.0 |
| Experimental example 3: A+ | ⓑ | 1.4 | 2.0 | 2.6 | 2.8 | 3.3 |
| Experimental example 4: B+ | ⓑ | 1.2 | 2.0 | 2.3 | 2.7 | 2.7 |
| Experimental example 5: A+ | ⓒ | 1.2 | 1.6 | 2.3 | 2.5 | 2.3 |
| Experimental example 6: B+ | ⓒ | 0.7 | 0.9 | 1.0 | 0 | 0 |
| Experimental example 7: C+ | ⓐ | 0.9 | 2.2 | 2.9 | 3.1 | 3.3 |
| Experimental example 8: C+ | ⓑ | 0.8 | 1.1 | 2.3 | 2.6 | 2.5 |
| Experimental example 9: C+ | ⓒ | 0.8 | 1.0 | 1.1 | 1.3 | 1.6 |

In Experimental example 1 (A+ⓐ), a very loud noise occurred, and as the extracted length is increased, the final retraction speed continuously increased (refer to FIG. 6).

In Experimental example 2 (B+ⓐ), the rate of increase in the final retraction speed was less than that of Experimental example 1, but there was no marked speed reduction effect (refer to FIG. 6).

It was verified by Experimental example 3 (A+ⓑ) and Experimental example 4 (B+ⓑ) that the structure having the acceleration prevention members made of hard plastic cannot provide the speed reduction effect (refer to FIG. 7).

In Experimental example 5 (A+ⓒ), there was a speed reduction effect, but the effect was immaterial (refer to FIG. 7).

In Experimental example 6 (B+ⓒ), there was a phenomenon of the bobbin stopping during the retraction of the blade, because the force of friction between the soft rubber brake and the rubber acceleration prevention members is excessively high (refer to FIG. 7).

It was verified by Experimental example 7 (C+ⓐ) that the structure having only the rubber rollers cannot provide the speed reduction effect (refer to FIG. 8).

In Experimental example 8 (C+ⓑ), there was a speed reduction effect, but the effect was immaterial (refer to FIG. 8).

It was verified by Experimental example 9 (C+ⓒ) that the marked speed reduction effect was obtained by the rubber rollers and the rubber acceleration prevention members (refer to FIG. 8).

It can be understood from the results of the experiment that when the rubber rollers come into contact with the rubber acceleration prevention members, the rubber rollers pass over the rubber acceleration prevention members with the appropriate frictional force occurring therebetween (at this time, because the rubber rollers can rotate, there is no probability of the bobbin being stopped), so that the rotational speed of the bobbin can be smoothly and reliably reduced.

Meanwhile, the applicant of the present invention determined from a test of the retraction speed of the blade that when the blade is retracted into the casing at a speed of 0.8 m/s or more, the user does not become bored. However, in the case where the blade is extracted to a length of about 1 m, the blade cannot be accelerated when the blade is retracted into the casing, and the time it takes for the blade to completely retract into the casing is very short. Thus, the retraction speed of 0.8 m/s or more is not necessarily required. On the other hand, in the case where the blade is extracted to a length of 3 m or more, the time taken to completely retract the blade into the casing is increased. Hence, it is preferable that the final retraction speed of the blade be at least 0.8 m/s or more.

Furthermore, the applicant of the present invention found out from the retraction speed test of the blade that when the blade is retracted into the casing at a speed of 2.0 m/s or more, the user may feel threatened. Therefore, it is desirable that when the blade is extracted to a length of 3 m or more, the final retraction speed of the blade be controlled such that it does not exceed 2.0 m/s.

FIGS. 9A through 9H illustrate various examples of the structure and disposition of the acceleration prevention members and the support ring according to the present invention.

As shown in FIGS. 9A, 9D and 9G, a single acceleration prevention member 170 may be provided on the support ring 101. Alternatively, as shown in FIGS. 9B, 9C, 9E and 9H, a plurality of acceleration prevention members 170 may be provided on the support ring 101 at positions spaced apart from each other.

As a further alternative, as shown in FIG. 9F, the acceleration prevention member 170 may be configured in such a way that irregularities are formed along the inner surface of the support ring 101

Furthermore, in the cases of FIGS. 9A through 9E, 9G and 9H, some portion(s) of the inner surface of the support ring 101 is covered with the acceleration prevention member(s) 170. When the bobbin rotates, the rollers 160 alternately come into contact with the inner surface of the support ring 101 and the acceleration prevention member(s) 170.

On the other hand, in the case of FIG. 9F, the entire inner surface of the support ring 101 is covered with the acceleration prevention member 170, so that when the bobbin rotates, the rollers 160 come into contact with only the acceleration prevention member 170.

Meanwhile, the second elastic member used in the present invention is not limited to a special member. In other words, any member including not only the structure explained in the above-mentioned embodiment but also, for example, a coil spring, a torsion spring, a compressible rubber member, a plate spring, an elastic cord, etc., can be used as the second elastic member, so long as it can provide an elastic support force.

As described above, in a tape measure with a self-regulating speed control mechanism according to the present invention, the speed at which a blade is retracted into a casing can be controlled by rubber rollers and rubber acceleration prevention members and maintained at an appropriate speed such that it is prevented from being excessively fast or slow. Furthermore, the tape measure of the present invention can prevent noise from occurring when the blade is retracted.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A tape measure with a self-regulating speed control mechanism, comprising:
   a casing;
   a bobbin rotatably provided in the casing;
   a blade wound around the bobbin, the blade having a first end fastened to the bobbin and a second end exposed outside the casing, with graduations marked on the blade and arranged in a longitudinal direction thereof so as to measure lengths;
   a first elastic member providing rotating force to the bobbin so that the blade that has been extracted from the casing is returned to an original position thereof by the rotating force of the bobbin;
   a movable mounting plate provided on a sidewall of the bobbin so as to be movable in such a way that a distance of the movable mounting plate from a rotation center of the bobbin is changed, so that when the bobbin rotates around the rotation center, the movable mounting plate is rotated around the rotation center along with the bobbin and moved away from the rotation center of the bobbin by centrifugal force applied to the movable mounting plate;
   a second elastic member provided on the sidewall of the bobbin, the second elastic member elastically supporting the movable mounting plate towards the rotation center of the bobbin;
   a roller rotatably mounted to the movable mounting plate, the roller being made of rubber;
   a support ring protruding from the casing towards the sidewall of the bobbin on which the movable mounting plate is provided;
   an acceleration prevention member made of rubber, the acceleration prevention member being provided on an inner surface of the support ring and covering a portion of the inner surface of the support ring, so that when the bobbin rotates, the acceleration prevention member comes into contact with the roller to prevent a rotational speed of the bobbin from increasing,
   wherein when the bobbin rotates, the roller alternately comes into contact with the inner surface of the support ring and the acceleration prevention member.

2. The tape measure as set forth in claim 1, wherein the acceleration prevention member protrudes from the inner surface of the support ring.

3. The tape measure as set forth in claim 1, wherein the acceleration prevention member comprises a plurality of acceleration prevention members provided on the inner surface of the support ring at positions spaced apart from each other.

4. The tape measure as set forth in claim 1, wherein when the blade which has been extracted from the casing to a length ranging from 3 m to 5 m is retracted to the original position thereof, a final retraction speed of the blade ranges from 0.8 m/s to 2.0 m/s.

5. The tape measure as set forth in claim 1, wherein the second elastic member comprises a plastic plate mounted to the bobbin, with a cantilever provided on the plastic plate, and
   the movable mounting plate has a first end supported on the sidewall of the bobbin by a pivot, and a second end coupled to a free end of the cantilever, so that the movable mounting plate is rotated around the pivot and elastically supported by the cantilever of the plastic plate.

* * * * *